US012560723B2

(12) United States Patent　　　　(10) Patent No.: US 12,560,723 B2
Lee　　　　　　　　　　　　　　　　(45) Date of Patent:　　Feb. 24, 2026

(54) RTK GROUP POSITIONING USING A TEMPORARY BASE TERMINAL DEVICE

(71) Applicant: Sangjoo Lee, Seoul (KR)

(72) Inventor: Sangjoo Lee, Seoul (KR)

( * ) Notice: Subject to any disclaimer, the term of this patent is extended or adjusted under 35 U.S.C. 154(b) by 304 days.

(21) Appl. No.: 18/197,779

(22) Filed: May 16, 2023

(65) Prior Publication Data

US 2023/0280470 A1　　Sep. 7, 2023

Related U.S. Application Data

(63) Continuation of application No. PCT/KR2020/016540, filed on Nov. 22, 2020.

(51) Int. Cl.
| | |
|---|---|
| *G01S 19/07* | (2010.01) |
| *G01S 19/43* | (2010.01) |
| *G01S 19/51* | (2010.01) |

(52) U.S. Cl.
CPC .............. *G01S 19/07* (2013.01); *G01S 19/43* (2013.01); *G01S 19/51* (2013.01)

(58) Field of Classification Search
CPC ........... G01S 19/07; G01S 19/43; G01S 19/51
See application file for complete search history.

(56) References Cited

U.S. PATENT DOCUMENTS

| | | | | | |
|---|---|---|---|---|---|
| 6,317,603 | B1 * | 11/2001 | Allison | .................... | G01S 19/43 |
| | | | | | 701/470 |
| 7,248,211 | B2 * | 7/2007 | Hatch | .................... | G01S 19/41 |
| | | | | | 342/357.31 |

| | | | | | |
|---|---|---|---|---|---|
| 7,482,974 | B2 * | 1/2009 | Ogawa | .................... | G01S 19/07 |
| | | | | | 342/357.44 |
| 2009/0189805 | A1 * | 7/2009 | Sauriol | .................... | G01S 19/54 |
| | | | | | 342/357.36 |

(Continued)

FOREIGN PATENT DOCUMENTS

| | | | |
|---|---|---|---|
| KR | 10-2007-0065319 | A | 6/2007 |
| KR | 10-1019717 | B1 | 3/2011 |

(Continued)

OTHER PUBLICATIONS

Search Report, mailed Aug. 18, 2021, for International Application No. PCT/KR2020/016540.

(Continued)

*Primary Examiner* — Marcus E Windrich
(74) *Attorney, Agent, or Firm* — LRK PATENT LAW FIRM

(57)　　　　　　　ABSTRACT

A method for calculating the precise positions of multiple terminal devices without the cost for permanent reference stations or local base station equipment includes combining the multiple terminal devices into a group, selecting the most appropriate terminal device from the group as a temporary base terminal device, checking if the temporary base terminal device is placed at a specific point whose position is known or easily knowable on a map, repeatedly performing relative RTK precise positioning algorithms to calculate relative positions between the temporary base terminal device and the other terminal devices, and finally adding the position of the specific place to the calculated relative positions to obtain precise position of all user terminal devices in the group.

3 Claims, 2 Drawing Sheets

(56)                    References Cited

U.S. PATENT DOCUMENTS

| | | | |
|---|---|---|---|
| 2015/0185331 A1* | 7/2015 | Dai | G01S 19/43 |
| | | | 342/357.29 |
| 2016/0116601 A1* | 4/2016 | Horn | G01S 19/51 |
| | | | 342/357.27 |
| 2017/0273864 A1* | 9/2017 | Kaufman | G09B 23/288 |
| 2019/0120973 A1* | 4/2019 | Martin | G01S 19/256 |
| 2019/0391274 A1* | 12/2019 | Chen | G01S 19/44 |
| 2022/0057530 A1* | 2/2022 | Wang | G01S 19/235 |
| 2025/0123402 A1* | 4/2025 | Rydström | G01S 19/073 |

FOREIGN PATENT DOCUMENTS

| | | |
|---|---|---|
| KR | 10-2014-0121939 A | 10/2014 |
| KR | 10-2017-0127912 A | 11/2017 |
| KR | 10-1942268 B1 | 1/2019 |
| KR | 10-2020-0131137 A | 11/2020 |

OTHER PUBLICATIONS

Written Opinion, mailed Aug. 18, 2021, for International Application No. PCT/KR2020/016540.

* cited by examiner

100

160 receiving
signals receiving
signals

130

150 a point where its position is
known or knowable on a map

FIG. 2

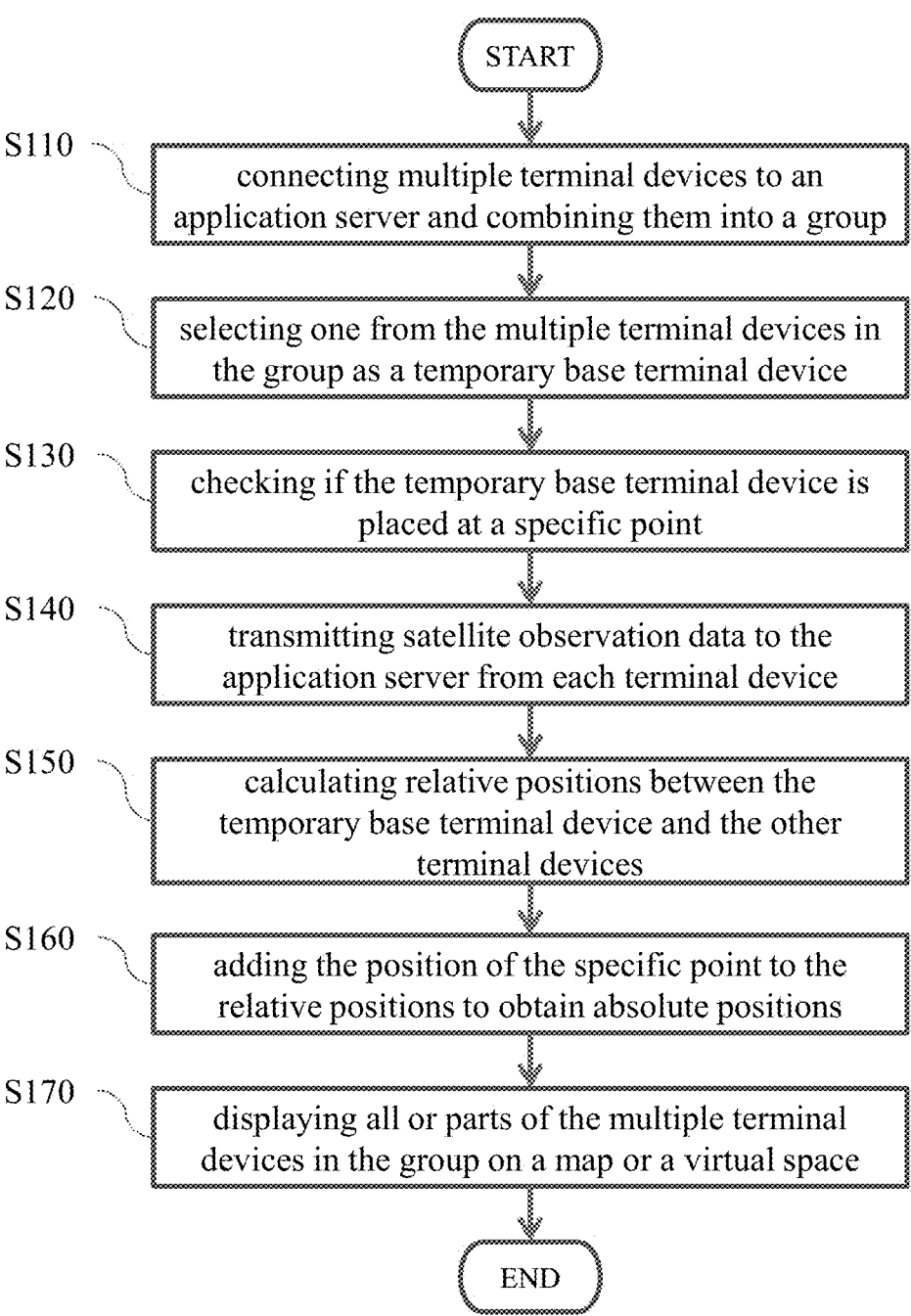

START

S110 — connecting multiple terminal devices to an application server and combining them into a group S120 — selecting one from the multiple terminal devices in the group as a temporary base terminal device S130 — checking if the temporary base terminal device is placed at a specific point S140 — transmitting satellite observation data to the application server from each terminal device S150 — calculating relative positions between the temporary base terminal device and the other terminal devices S160 — adding the position of the specific point to the relative positions to obtain absolute positions S170 — displaying all or parts of the multiple terminal devices in the group on a map or a virtual space

END

RTK GROUP POSITIONING USING A TEMPORARY BASE TERMINAL DEVICE

CROSS-REFERENCE TO RELATED APPLICATION(S)

This application is a continuation of International Application No. PCT/KR2020/016540, filed on Nov. 22, 2020, the entire content of which is hereby incorporated by reference.

BACKGROUND OF THE INVENTION

1. Field of the Invention

The present invention relates to the field of real-time precise positioning systems and methods using GNSS (Global Navigation Satellite System).

2. Description of Related Art

Positioning methods using the GNSS satellite signals inevitably have poor accuracy due to various errors inherent in the GNSS satellite signals. For expansion into applications requiring higher reliability, GNSS correction service which improves positioning accuracy by using error correction information measured and calculated by a reference station is used.

For GNSS correction service, various types of GNSS error correction signals have been developed and are largely classified into SSR (State Space Representation) method and OSR (Observation Space Representation) method.

SSR-based error correction signals typically include error correction signal transmitted from SBAS (Satellite Based Augmentation System) satellites and PPP-RTK correction signal which is considered as a next-generation error correction signal.

OSR-based error correction signals typically include DGPS correction signal that supports meter level positioning using low-cost receivers and RTK (Real-Time Kinematic) correction signal that supports centimeter level high-precision positioning.

DGPS (Differential GPS) refers to various positioning methods that process GNSS observation data by differential positioning in a broad sense, but refers to an OSR method that supports positioning using GNSS code observation data in a narrow sense. RTK, which is a real-time precise positioning, uses carrier wave of GNSS (GPS) signals to calculate position. Therefore accuracy of RTK is relatively higher than accuracy of DGPS which uses only GNSS codes.

NRTK (Network-based Real Time Kinematic) connects multiple reference stations into a network, collects error correction signals from multiple reference stations placed near the user's position, and then comprehensively utilizes them to correct RTK errors suitable for the user's position. An error correction signal suitable for a terminal device is generated by interpolation. NRTK has the advantage of being able to support a wide area with limited reference station resources by virtue of this interpolation capability.

If the baseline distance between two points is less than 10 km, the relative positioning method can be used, which removes the common error contained in the satellite signals received at the two points and measures relative position between the two points using the double difference technique. This method has high precision and can be used for precise geodetic surveys, but if distance between two points exceeds 10 km, the premise that the error included in the satellite signal is common does not hold, so the precision is greatly reduced.

The RTK system of the relative positioning method generally uses a reference station that knows its precise position, a user terminal device which determines integer ambiguity of a double-differentiated carrier using data transmitted from the reference station and estimates the current position, and a data communication link for transmitting satellite observation data from the reference station to the user terminal device. However, if only relative position between two user terminal devices is needed, a dedicated local base station or a CORS (Continuously Operating Reference Station) whose precise position is known can be eliminated from the prerequisite.

SUMMARY OF THE INVENTION

Precise positioning using RTK technology requires positioning correction data generated by CORS (Continuously Operating Reference Station) or dedicated local base station equipment. However, in order to popularize industries related to the 4th Industrial Revolution, a precise positioning method, free from the constraints of constantly accessing a permanent reference station server or operating local base station equipment, is required.

After connecting multiple user terminal devices to an application server and combining them into a group, the application server selects the most appropriate user terminal device from the group as a temporary base terminal device and checks if the temporary base terminal device is placed at a specific place with a known precise position or easily knowable precise position such as a corner of a known building, performs a relative positioning RTK algorithm using satellite observation data sent from the user terminal devices in the group to calculate relative positions between the temporary base terminal device and the other terminal devices, and finally add the position of the specific place to the calculated relative positions to obtain precise position of all user terminal devices in the group.

The method of the present invention uses an application server that combines multiple random members into a group, selects the most appropriate one from the group as a temporary base station, precisely calculates the absolute positions of all members, and thus eliminates the cost of local base station equipment or using CORS service.

This method is expected to contribute to the popularization of industries related to the 4th Industrial Revolution such as members' position-based two-dimensional (2D) or three-dimensional (3D) games, virtual reality (VR) experiences, and augmented reality (AR) experiences, because the absolute position of each member can be precisely calculated and displayed on a plane or space regardless of the availability, stability or cost of permanent reference stations or local base station equipment.

BRIEF DESCRIPTION OF THE DRAWINGS

FIG. 2 is a flowchart illustrating a procedure of RTK group positioning using a temporary base terminal device.

DETAILED DESCRIPTION OF THE INVENTION

Figure 1:
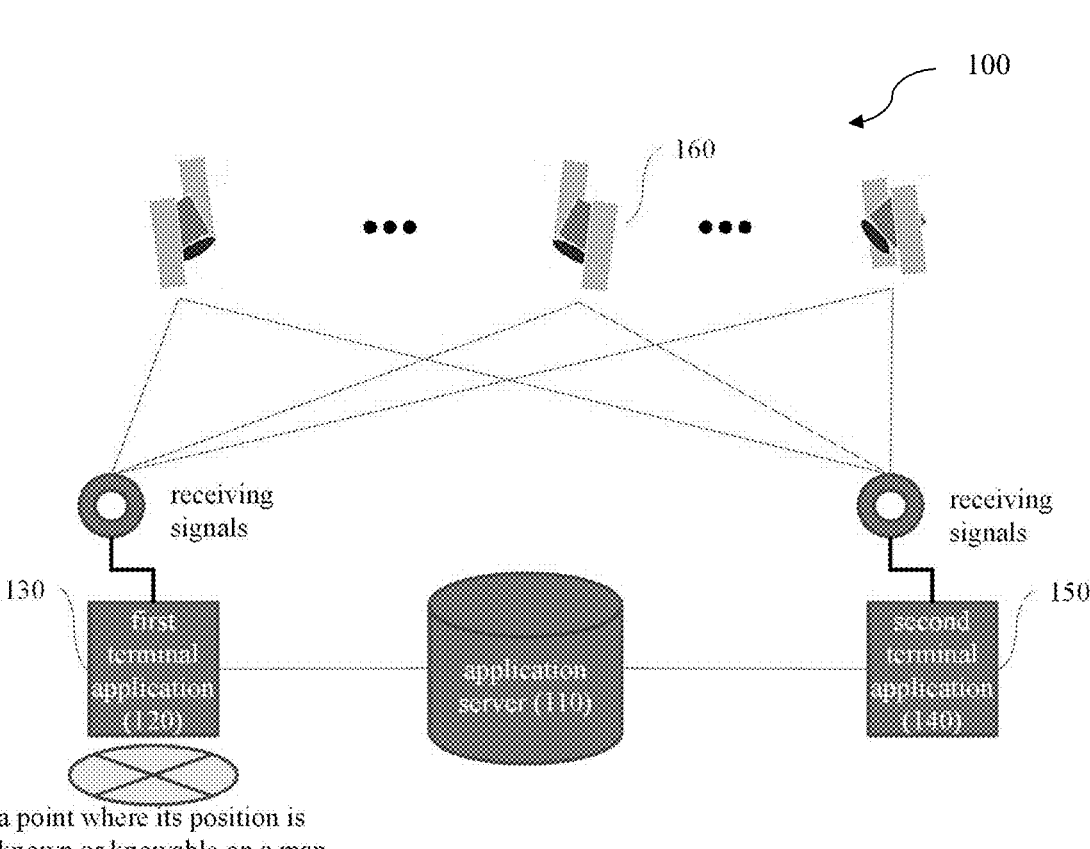
FIG. 1 is a conceptual diagram schematically illustrating an RTK group positioning system using a temporary base terminal device.

Specific structural or functional descriptions of the embodiments disclosed in the specification or application of the present invention are for illustrative purpose only and do not limit the present invention. Descriptions of technical contents that are well known in the technical field to which the present invention pertains and are not directly related to the present invention will be omitted.

FIG. 1 is a conceptual diagram schematically illustrating an RTK group positioning system using a temporary base terminal device.

As shown in FIG. 1, the RTK group positioning system 100 using a temporary base terminal device includes GNSS navigation satellites 160, a first terminal device 130 receiving signals from the GNSS navigation satellites 160, and a first terminal application 120 driving the first terminal device 130, a second terminal device 150 receiving signals from the GNSS navigation satellites 160, a second terminal application 140 driving the second terminal device 130, and an application server 110 in charge of executing a relative positioning RTK algorithm. The first terminal device 130 or the second terminal device 150 is preferably a mobile terminal device such as a smart phone, a tablet PC, or a navigation terminal device.

In the present embodiment, only the first terminal device 130, the first terminal application 120 driving the first terminal device 130, the second terminal device 150, and the second terminal application 140 driving the second terminal device 150 are specifically described, but this embodiment can be expanded to three or more applications and terminal devices.

The GNSS navigation satellites 160 include satellites of the Global Positioning System (GPS) of the United States, the Galileo satellites of Europe, satellites of the Global Navigation Satellite System (GLONASS) of Russia, and/or the BeiDou satellites of China.

The first terminal application 120 and the second terminal application 140 are connected to the application server 110 and combined into a group.

The application server 110 selects the first terminal device 130 driven by the first terminal application 120 from the group as a temporary base terminal device.

The application server 110 checks if the first terminal device selected as the temporary base device is placed at a specific point whose position is known or easily knowable on a map such as a corner of a known building. The first terminal application 120 and the second terminal application 140 respectively receive the GNSS navigation satellite 160 signals, obtain satellite observation data, and transmit satellite observation data to the application server 110.

The application server 110 performs a relative positioning RTK algorithm and calculates relative position of the second terminal device from the temporary base terminal device. And, by adding the absolute position of the specific point to the relative position, the precise absolute positions of the second terminal devices can be calculated and displayed on a two-dimensional (2D) or three-dimensional (3D) real map or a virtual space. If the third terminal device participates, the relative position of the third terminal device from the temporary base terminal device can be calculated and displayed in the same way.

The method of the present invention can be suitably utilized for a two-dimensional or three-dimensional game based on the position of each member, or virtual reality (VR) or augmented reality (AR).

FIG. 2 is a flowchart illustrating a procedure of RTK group positioning using a temporary base terminal device.

Applications of multiple terminal devices capable of receiving GNSS signals connects to the application server 110 to be combined into a group (S110).

The application server selects the most appropriate terminal device from the group as a temporary base terminal device (S120).

The temporary base terminal device is placed at a specific point where the position is known or can be easily estimated on a map (S130).

All terminal devices receive GNSS signals, obtain satellite observation data, and transmit satellite observation data to the application server 110 (S140).

Given the satellite observation data from the temporary base terminal device and the satellite observation data from any one of the other terminal devices, the application server 110 performs a relative positioning RTK algorithm to calculate a relative position, and hence repeatedly obtains relative positions between the temporary base terminal device and the other terminal devices (S150).

Absolute positions of all terminal devices are obtained by adding the position of the specific point to the relative positions (S160).

The absolute positions of all or parts of the multiple terminal devices in the group are displayed on a 2D or 3D real map or a virtual space (S170).

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method for calculating precise positions of multiple terminal devices capable of receiving navigation satellite (GNSS) signals without reference stations using an application server that performs a relative positioning real-time kinematic (RTK) algorithm, the method comprising:

connecting applications running at the multiple terminal devices to the application server and combining the multiple terminal devices into a group;

selecting one from the multiple terminal devices in the group as a temporary base terminal device;

checking if the temporary base terminal device is temporarily paused at a specific point whose position is known or computable from nearby known points;

obtaining satellite observation data derived by applications running on each terminal device in the group;

given the satellite observation data of the temporary base terminal device and the satellite observation data of any terminal device other than the temporary base terminal device in the group, repeatedly performing a relative positioning RTK algorithm to calculate relative positions between the temporary base terminal device and the other terminal devices in the group; and calculating absolute positions of the multiple terminal devices in the group by adding the position of the specific point to the relative positions.

2. The method of claim 1, further comprising:

displaying the absolute positions of all or parts of the multiple terminal devices in the group on a two-dimensional (2D) or three-dimensional (3D) real map or a virtual space.

3. The method of claim 2, wherein the 2D or 3D real map or the virtual space is combined with 2D or 3D games, virtual reality (VR) experiences, or augmented reality (AR) experiences.

* * * * *